United States Patent [19]

Smith

[11] 4,447,835
[45] May 8, 1984

[54] METHOD AND APPARATUS FOR SINGLE FRAME RECORDING ON VIDEO TAPE

[75] Inventor: Grant M. Smith, Menlo Park, Calif.

[73] Assignee: Sony Corporation, Tokyo, Japan

[21] Appl. No.: 338,360

[22] Filed: Jan. 11, 1982

[51] Int. Cl.³ .................. H04N 5/78; G11B 21/02
[52] U.S. Cl. ........................... 360/10.2; 360/14.2
[58] Field of Search ............... 358/310, 312, 335; 360/10.1, 10.2, 14.2, 77

[56] References Cited

U.S. PATENT DOCUMENTS

| 4,172,265 | 10/1979 | Sakamoto et al. | 360/70 |
| 4,223,358 | 9/1980 | Kubota et al. | 360/75 |
| 4,296,443 | 10/1981 | Sakamoto et al. | 360/10.2 |

FOREIGN PATENT DOCUMENTS

| 2031640A | 4/1980 | United Kingdom . |
| 2039098B | 7/1980 | United Kingdom . |
| 1573064 | 8/1980 | United Kingdom . |
| 1576538 | 10/1980 | United Kingdom . |
| 2068599A | 8/1981 | United Kingdom . |

Primary Examiner—Robert L. Richardson
Attorney, Agent, or Firm—Philip M. Shaw, Jr.

[57] ABSTRACT

A method and an apparatus for frame-by-frame recording of an RF signal on a magnetic tape uses a video tape recorder (VTR) having a dynamic tracking head. While the tape is stopped, the tracking control voltage generated by the VTR during the playback of a prerecorded tape segment is stored. The tape is then moved to the desired location and stopped. The stored tracking control voltage is then applied to the dynamic tracking head during the recording of a new set of RF signals representative of a video frame.

11 Claims, 6 Drawing Figures

METHOD AND APPARATUS FOR SINGLE FRAME RECORDING ON VIDEO TAPE

BACKGROUND OF THE INVENTION

The present invention relates to a method and an apparatus for recording a radio frequency (RF) carrier signal which has been FM modulated with a video signal on a magnetic tape and, more particularly, wherein said invention is suitable for recording an electrical signal, representative of a single frame of a video image, at a time, on a magnetic tape using a dynamic tracking head.

Recordation of RF signals on a magnetic tape is well-known in the art. One application of video tape recording is frame-by-frame recordation of still images to achieve a desired special effect, such as animation.

Heretofore, the method for accomplishing frame-by-frame recording has required the user, after the recordation of one frame, to stop the tape, rewind the tape, stop the tape again, and play the tape in a forward mode until the last recorded frame is reached and then while the tape is still being played, activate the recording head to record the new frame. These repeated steps of stopping, rewinding, and playing forward for each frame cause extreme wear on the tape.

Typically, in a video tape recorder (VTR), RF signals, corresponding to one field, are recorded on one track. The tracks are recorded on the tape as the recording head is rotated, while simultaneously the tape is advanced in a linear direction. The result is that each track recorded on the tape is linear but at an angle to the direction of tape motion, with each track parallel to one another. Two tracks define one frame. All of the foregoing standards are set by the Society of Motion Picture and Television Engineers (SMPTE), and are well-known in the art. These standards apply in the U.S. (NTSC) as well as in Europe.

Because each track is recorded while the tape is moving, if the tape is stopped and a conventional playback head, rotating about an axis by a motor, reads back the previously recorded track, the playback head will not follow the track and the playback signal will diminish in strength towards the end of the field.

A video tape recorder with a dynamic tracking head is well known in the art A dynamic tracking head can be moved by a transducer activated cantilever, operating in response to a tracking control signal, in a direction substantially perpendicular to the direction of tape travel. In addition, the head can be rotated to follow the track of RF signal, as recorded on the magnetic tone.

The function of a dynamic tracking head is to follow the curvature of the track in the playback mode while the tape is stopped or is moving slowly, either in the forward mode or in the reverse mode. This results in faithful reproduction of a still image, while the tape is stopped, and faithful reproduction of a slow motion image, while the tape is moving slowly.

The technique of adjusting the movement of the dynamic tracking head in order for the head to follow the recorded track on the magnetic tape, while the tape is stopped is well-known in the art. One example is to use a feedback signal from the RF section of the VTR to change the tracking control voltage supplied to the cantilever transducer on which the dynamic tracking head is mounted. In the event the RF signal degrades, the tracking control voltage to the cantilever transducer is changed to move the head so that the head will be on track.

SUMMARY OF THE INVENTION

In the present invention, a method and an apparatus are disclosed for controlling a video tape recorder/player, which has a movable recording head that moves in response to a tracking control signal. The invention is directed to the recordation of a signal containing video information on a stationary segment of a magnetic tape, which has a portion of prerecorded signals. The invention comprises means for deriving a tracking control signal based on the playback of the prerecorded signals, while the portion is stationary. The tracking control signal is stored in a storage means. The stored tracking control signal is supplied to the recording head during the recordation of said signal on said stationary segment.

DETAILED DESCRIPTION OF THE DRAWINGS

DETAILED DESCRIPTION OF THE DRAWINGS

Figure 1:
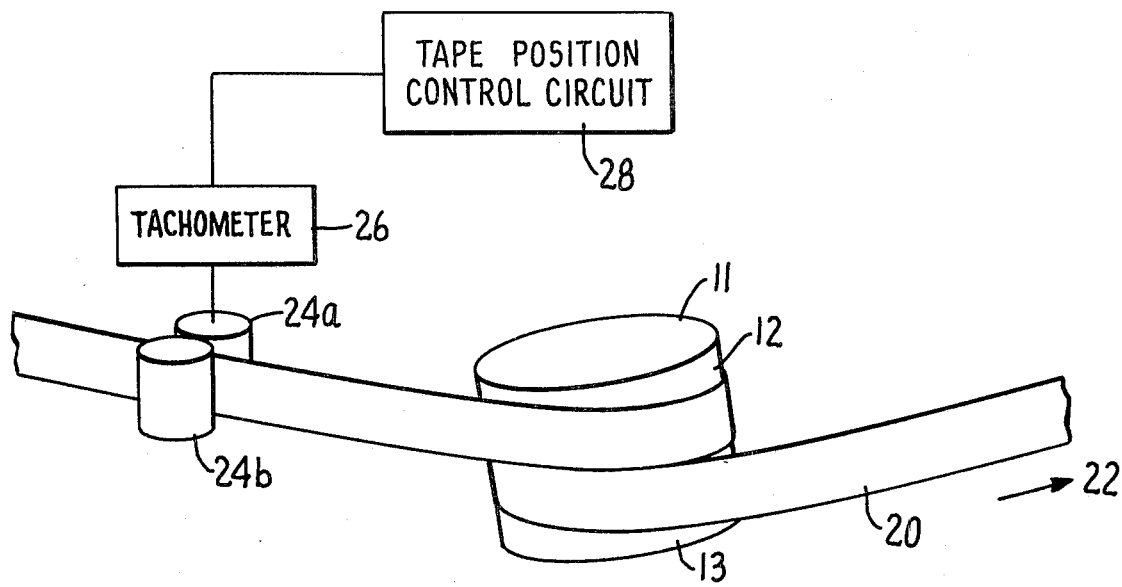
FIG. 1 is a diagrammatic, perspective view of a portion of an apparatus for practicing the method of the present invention.
Figure 2:
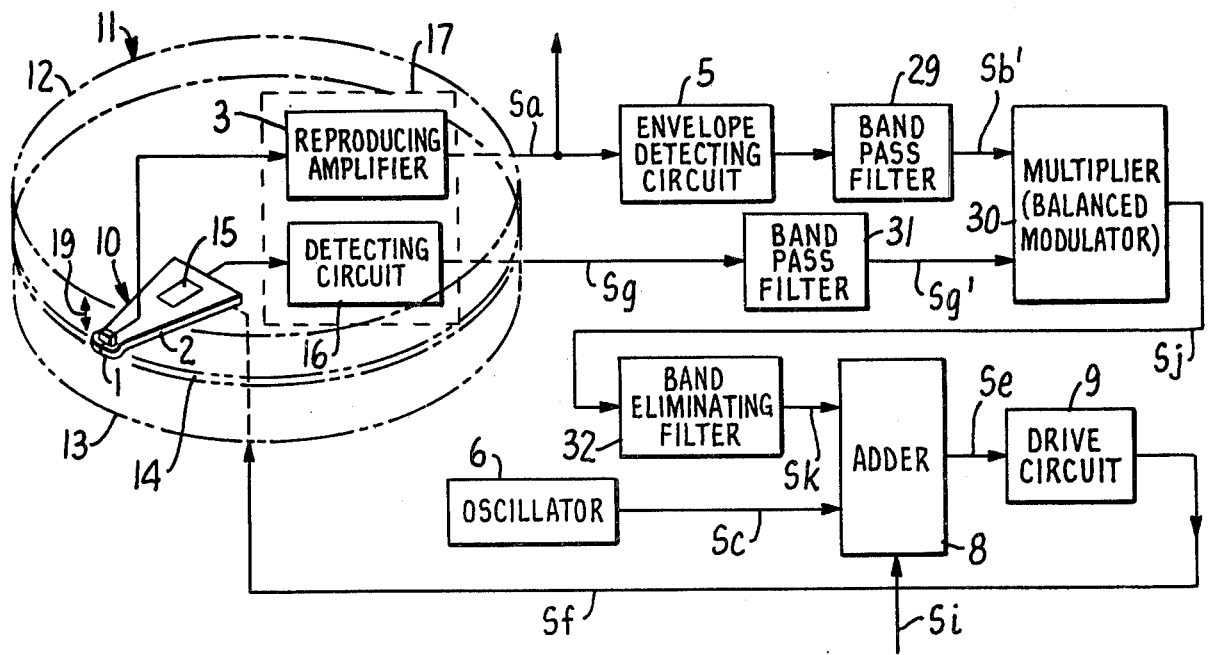
FIG. 2 is a diagrammatic view showing a portion of the tracking head and its associated electronics used in the present invention.

Referring to FIG. 1, there is shown a portion of a video tape recorder (VTR) including a dynamic tracking head 10. A guide drum assembly 11 houses the dynamic tracking head 10. A magnetic tape 20 is helically wrapped about the guide drum assembly 11. The tape 20 is typically one inch in width. A magnetic recording transducer 1, which is part of the head 10, can be used to read the signals recorded on the tape 20 during the playback mode, or it can also be used to record a radio frequency carrier signal which is FM modulated with a video signal on the tape 20. The tape 20 is moved in a direction 22 by a capstan 24a and a pinch roller 24b and motor drives (not shown). A tachometer 26 is connected to a capstan 24a and a pinch roller 24b to accurately measure the linear position of the tape 20. The output of the tachometer 26 is supplied to a tape position control circuit 28, which controls the linear position of the tape 20. All of the components described heretofore are well-known in the art.

The guide drum assembly 11 includes a rotatable upper drum portion 12 and a stationary lower drum portion 13 with a radially opening circumferential slit 14 being defined between drum portions 12 and 13. A bi-morph leaf 2 of piezo-ceramic material is fixed at the base or inner end to the bottom surface of the rotatable upper drum portion 12 so that the magnetic transducer 1 in the bi-morph leaf 2 extends through slit 14 and is movable vertically or in the direction 19 parallel to the axis of rotation of upper drum portion 12 in response to the deflection of bi-morph leaf 2 by the application of a drive signal $S_f$ thereto. The magnetic tape 20 is wrapped helically around the periphery of drum 11 so that, upon rotation of head 1 with upper drum portion 12, head 10 scans obliquely across the magnetic tape 20 and is simultaneously moved or oscillated in the direction normal to the scanning direction in response to the deflection of bi-morph leaf 2.

A strain gauge 15 is secured to the surface of bi-morph leaf 2 to be stressed variably in response to the deflection of the latter and to cooperate with an associated circuit 16 for generating a deflection signal $S_g$ which instantaneously and accurately indicates the extent and direction of deflection of transducer 1 from its rest position. The deflection signal generating circuit 16 and the reproducing amplifier 3 for amplifying the output of transducer 1 are included in a circuit assembly 17 which is suitably arranged within the rotary upper drum portion 12 of the guide drum assembly 11.

Figure 3:
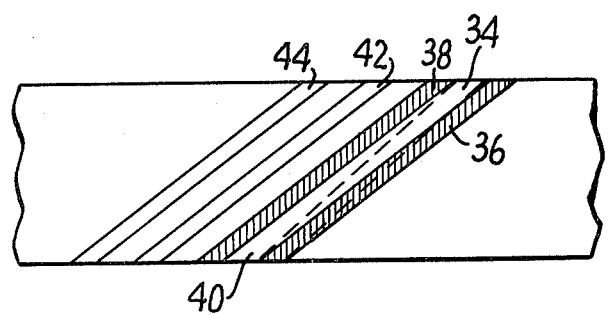
FIG. 3 is a schematic, enlarged view of a portion of a magnetic tape, having pre-recorded tracks.

Referring to FIG. 3, there is shown a portion of a tape 20 having RF signals recorded thereon. The RF signals are recorded in tracks, such as first track 36 and second track 38. The tracks are substantially parallel to one another with each adjacent track spaced apart from one another and separated by a guard band 40. Each track contains an RF signal representative of one field of a television image.

Because the tracks are recorded while the tape 20 is moving and while the transducer 1 is rotating, the first and second tracks 36 and 38 are linear and are at an angle with respect to the direction 22 of motion of the tape 20. In a conventional VTR, in the event the tape 20 is stopped, and only the transducer 1 is moved, the transducer 1 will pick-up the signals shown substantially by the dotted line 34. The path 34 is also linear and is at an angle with respect to the direction 22 of motion of the tape 20. However, the angle of the path 34 is different than the angle of the first track 36. As seen in FIG. 3, the transducer 1 will follow the first track 36 for a while. However, near the end of the field defined by the first track 36, the path 34 will diverge from the first track 36. The result is that the transducer 1 near the end of the field, as recorded on first track 36, will no longer pick up the RF signals for that field.

Figure 6:
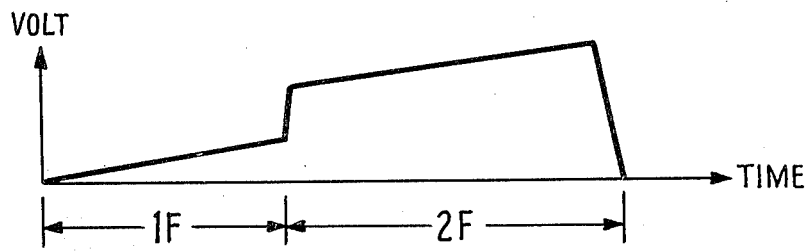
FIG. 6 is a graph of a typical curve of tracking control signal voltage versus time generated by the apparatus of FIG. 1.

Since the head 10 is a dynamic tracking head 10, through well-known feedback circuitry, the head 10 can follow the recorded signals on the first track 36. This is accomplished by applying a tracking control voltage to the bimorph leaf 2 which moves the dynamic tracking head 10 in a direction 19, while the transducer 1 is rotated. A typical waveform of the voltage applied to the strain gauge 15 is shown in FIG. 6. The waveform step at the end of field one (1F) is necessary since the dynamic tracking head must move the distance of one track or field ($7.09 \times 10^{-3}$ inches or $18 \times 10^{-3}$ cm) in order to record/playback the second field of the frame.

The method and apparatus of the present invention solves the problem of recordation of signals containing video information on a magnetic tape, while the tape 20 is stopped. More particularly, the method and apparatus of the present invention is applicable to frame-by-frame recordation. The tape 20 has a prerecorded portion as shown by first and second tracks 36 and 38, respectively. The tape 20 is first moved into position and stopped such that the dynamic tracking head 10 can read the RF signals of the pre-recorded portion. Preferably, the tape 20 is positioned such that the dynamic tracking head 10 reads the last frame of the pre-recorded portion of the tape, which is immediately adjacent to the location where it is desired to record the video signal. (in FIG. 3, the last frame is shown as first and second tracks 36 and 38).

The first and second tracks 36 and 38 are played back by the transducer 1. As the dynamic tracking head 10 follows the first and second tracks 36 and 38, the tracking control voltage is generated by conventional circuitry 49 within the VTR. This tracking signal is supplied to the bimorph leaf 2 and is also stored in a memory 54. The tape 20 is then advanced and stopped. The amount of tape 20 which is advanced is arbitrary, depending upon the application. For example, the tape 20 can be advanced one field or one frame. The tape 20 is advanced and stopped accurately by the tape position control circuit 28, which is based upon the output of the tachometer 26. The RF signal is then recorded by the dynamic tracking head 10 while using the stored tracking control voltage to operate the bimorph leaf 2. Thus, the newly recorded tracks 42 and 44 will be parallel to and have the same shape as the shape of the first and second tracks 36 and 38, respectively, i.e. as if the newly recorded tracks 42 and 44 are made while the tape 20 is moving. On continuous playback, i.e. playback while the tape 20 is moving, the tracks 42 and 44 will be picked up and played back by the head 10 in the normal fashion.

For frame-by-frame recordation, the steps can be repeated, i.e. playback the new tracks 42 and 44, and store the tracking control voltage in the memory 54, the use the stored control voltage to activate the bimorph leaf 2 during the recordation of the next frame. Alternatively, the original tracking control voltage stored in the memory 54 can be used during the recordation of a plurality of frames.

Figure 4:
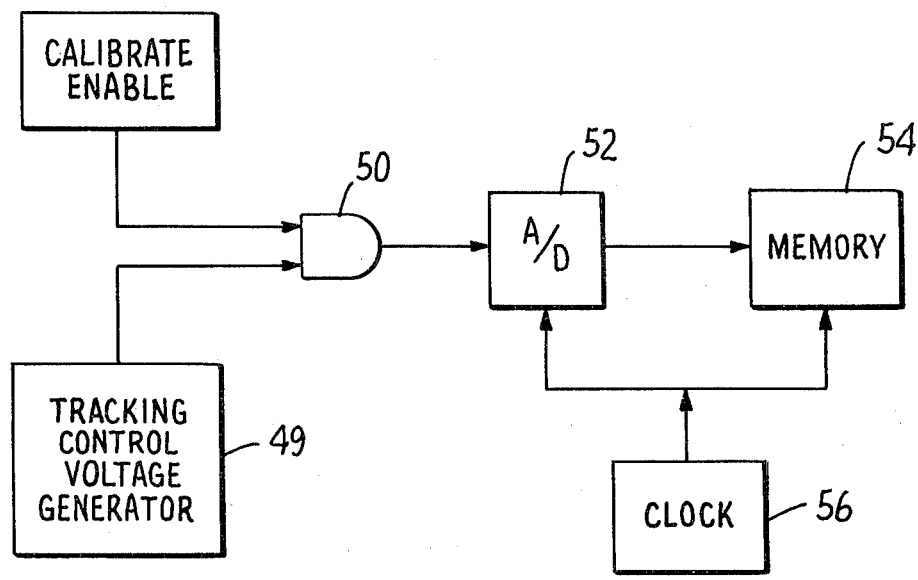
FIG. 4 is a schematic block diagram of a portion of the apparatus of the present invention.

Referring to FIG. 4, there is shown a portion of the apparatus of the present invention for storing the tracking control voltage used to move the dynamic tracking head 10 as it plays the first and second tracks 36 and 38, respectively. In this mode of operation, designated as the calibration mode, during playback of the prerecorded frames from the stationary tape, a tracking control signal to the dynamic tracking head 10 is generated in a conventional manner by the generator 49. A calibration enable signal is activated when it is desired to store the tracking control voltage. The tracking control voltage and the calibration signal are supplied to a first AND gate 50. With the calibration enable signal on, the first AND gate 50 passes the tracking control voltage therethrough. In the absence of the calibration enable signal, the tracking control voltage would not be passed through the first AND gate 50. Thus, the calibration enable signal acts is a switch for storage of the tracking control voltage. From the first AND gate 50, the analog tracking control voltage is converted into a four bit digital signal by the A/D converter 52. The four bits of digital signal are stored in a memory 54. A clock 56 operating at 15,750 Hz, or one timing pulse per horizontal line of video information, is used to control the sampling rate of the conversion of the A/D converter 52 and the storage of the digital bits in the memory 54. Since the clock 56 operates at the sampling rate of one sample per horizontal line, and since in the United States, the NTSC Standard requires 525 lines per frame, the memory 54 must have a total capacity of at least 2,100 (4×525) bits.

Figure 5:
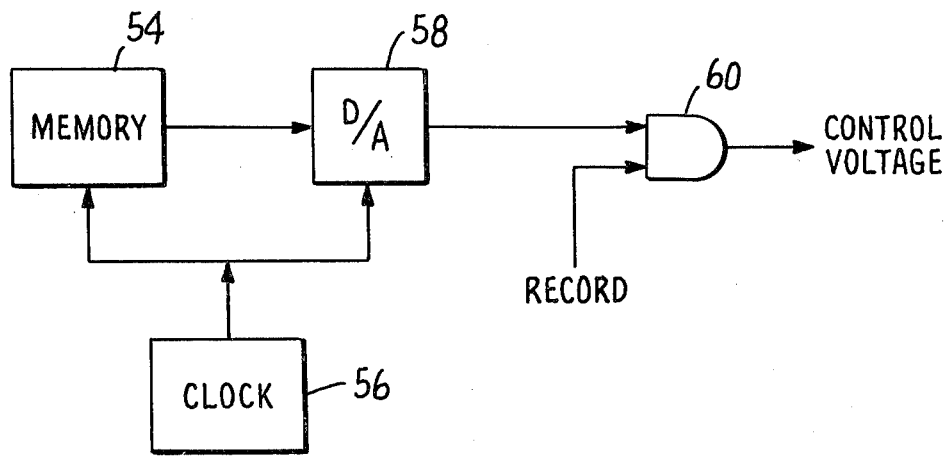
FIG. 5 is a schematic block diagram of another portion of the apparatus of the present invention, which, together with the portion shown in FIG. 4, comprise the apparatus of the present invention.

Once the digital tracking control signal is stored in the memory 54, tape 20 is moved to the desired recording location and stopped. Referring to FIG. 5, there is shown the other portion of the apparatus of the present invention. The digital tracking control signal stored in the memory 54 is converted by a D/A converter 58 to an analog signal. The D/A converter 58 has the same accuracy as the A/D converter 32, i.e., four bits of digital signal provide the input to the D/A converter 58. The clock 56, operating at the sampling rate of one sample per horizontal line of video signal, is the same clock 56 in FIG. 4 that was used to clock the tracking control signal into the memory 54. In FIG. 5, the clock 56 operates to clock the tracking control signal stored in memory 54 out through the D/A converter 58. The tracking control signal and a record signal are passed through a second AND gate 60. The record signal is generated by the VTR when it is switched to the recording mode. When the record signal is on, the control voltage will be passed through the second AND gate 50. The tracking control voltage is then applied to the bimorph leaf 2 of the dynamic tracking head 10 to move it as the RF signal is recorded on the tape 20. The recordation of the RF signal is made while the tape 20 is stopped.

It should be clear that the degree of accuracy of the A/D converter 52 or of the D/A converter 58 can be different from the example shown herein. Moreover, the capacity of the memory 54 can be of any size so long as the memory 54 can store all the bits from the A/D converter 52 and at the rate dictated by the clock 56. In addition, of course, the clock 56 can operate at different frequencies. The rate of one sample per horizontal line is chosen for convenience because a timing signal at that rate is available from the RF signals, either prerecorded on the tape, or to be recorded on the tape.

What is claimed is:

1. A method for controlling a video tape recorder/player, of the type having a movable recording head operating in response to a tracking control signal, to record an electrical signal on a stationary magnetic tape, a portion of said tape having a pre-recorded signal, said method comprising the steps of:
    deriving a tracking control signal based upon the playback of the prerecorded signal while the portion is stationary;
    storing said tracking control signal;
    advancing said tape to a location where said electrical signal is to be recorded;
    stopping said tape; and
    recording said electrical signal by said head in accordance with said stored tracking control signal.

2. The method of claim 1 wherein said deriving step further comprises the step of:
    moving said tape such that said pre-recorded signal can be read by a movable playback head;
    stopping said tape; and
    playing said portion with said playback head, generating a tracking control signal thereby.

3. The method of claim 2 wherein said playback head is said recording head.

4. The method of claim 3, wherein said playing step plays the last frame in said portion immediately adjacent to said location.

5. The method of claim 4, wherein said electrical signal to be recorded represents a single frame.

6. The method of claim 5 wherein said recording head is a dynamic tracking head.

7. An apparatus for controlling a video tape recorder/player having a movable recording head, operating in response to a tracking control signal, said recorder/player for recording an electrical signal containing video information on a stationary segment of a magnetic tape, a portion of said tape having a prerecorded signal, said apparatus comprising
    playback means for deriving a tracking control signal based upon the playback of the pre-recorded signal while the portion is stationary;
    storage means for storing said tracking control signal; and
    means for supplying said stored tracking control signal to said head during the recording of said electrical signal containing video information on said stationary segment.

8. The apparatus of claim 7, wherein said storage means is a digital storage means.

9. The apparatus of claim 8 further comprising
    gate means for controlling said storage means to store or reproduce said tracking signal; and
    A to D converting means for receiving said tracking signal after passing through said gate means and for producing a digital tracking signal for storage in said storage means.

10. The apparatus of claim 9 further comprising
    D to A converting means for receiving said digital tracking signal from said storage means, for generating an analog tracking signal therefrom, and for supplying said analog tracking signal to said gate means.

11. The apparatus of claim 10 further comprising
    timing means for clocking said tracking signal into said A/D converting means and into said storage means, and for clocking said digital tracking signal from said storage means into said D/A converting means.

* * * * *